United States Patent [19]

Bouwhuis

[11] 3,855,426

[45] Dec. 17, 1974

[54] VIDEO DISC RECORDING AND OPTICAL PLAYBACK SYSTEM THEREFOR

[75] Inventor: Gijsbertus Bouwhuis, Emmasingel, Eindhoven, Netherlands

[73] Assignee: U.S. Philips Corporation, New York, N.Y.

[22] Filed: July 25, 1973

[21] Appl. No.: 382,482

Related U.S. Application Data

[63] Continuation of Ser. No. 227,210, Feb. 17, 1972, abandoned.

[30] Foreign Application Priority Data

Mar. 11, 1971 Netherlands ...................... 7103233

[52] U.S. Cl....179/100.3 V, 178/6.7 A, 179/100.3 B, 179/100.3 G, 179/100.3 K, 179/100.4 R, 179/100.41 L, 274/41 R

[51] Int. Cl...... H04n 5/76, G11b 7/24, G11b 23/18

[58] Field of Search...179/100.3 V, 100.3 B, 100.3 G, 179/100.4 M, 100.4 C, 100.4 R, 100.41 L, 100.3 E, 100.3 K; 178/6.6 R, 6.7 R, 6.7 A, 6.6 TP; 274/41 R, 41 A, 41.6 R, 42 R; 340/173 TP; 346/74 TP, 77 R, 77 E

[56] References Cited

UNITED STATES PATENTS

| | | | |
|---|---|---|---|
| 2,554,679 | 5/1951 | Mitchell | 179/100.3 E |
| 2,950,971 | 8/1960 | Lewin | 179/100.3 B |
| 3,430,966 | 3/1969 | Gregg | 274/42 R |
| 3,518,442 | 6/1970 | Johnson | 179/100.3 V |

*Primary Examiner*—Raymond F. Cardillo, Jr.
*Attorney, Agent, or Firm*—Frank R. Trifari; Simon L. Cohen

[57] ABSTRACT

A disc-shaped information carrier is described which contains spirally arranged image and/or sound signals coded in optical form. By recording the information in at least two spiral information tracks which may be separately read the total amount of untilizable information may be increased by a factor equal to the number of information tracks.

The information carrier can be read by means of an apparatus in which there is inserted in the path of the radiation from a source of radiation to a radiation-sensitive detection system an optical system capable of so influencing the read beam that this beam is suitable for reading one track at a time.

4 Claims, 8 Drawing Figures

PATENTED DEC 17 1974 3,855,426

SHEET 1 OF 3

VIDEO DISC RECORDING AND OPTICAL PLAYBACK SYSTEM THEREFOR

Figure 1:
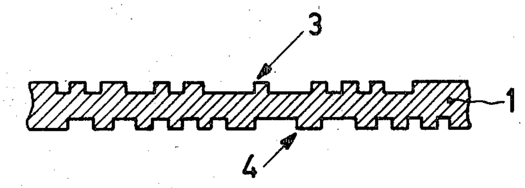

This is a continuation, of application Ser. No. 227,210, filed Feb. 17, 1972, now abandoned.

The invention relates to a disc-shaped information carrier which contains spirally arranged sound and/or image signals coded in optical form and which may be read by means of a beam of radiation. The invention also relates to an apparatus for reading such an information carrier. With spirally arranged is meant arranged in a great number of quasi-concentric or concentric stripes.

An information carrier and a reading apparatus of the said type are described in U.S. Pat. Specification No. 3,381,086. The known information carrier consists of a support of radiation-transmitting material on which has been provided a spiral track of radiation-absorbing areas. This information carrier is read by scanning it with a beam of radiation and directing the beam of radiation transmitted by the information carrier on to a radiation-sensitive detector cell. The output signal of this cell may be used as a video signal or audio signal for an image display or sound playback apparatus respectively.

Disc-shaped information carriers when compared with magnetic tapes have the great advantage that they can rapidly and simply be reproduced. Moreover they are cheaper than magnetic tapes and the information can be recorded in a more compact form than is possible on magnetic tapes. With optical reading the information density may be greater than with magnetic reading.

Although in the known information carrier the information is stored in compact form, the playing time of a disc of normal size (outer diameter about 30 cm) is comparatively short, so that for viewing a program discs will frequently have to be changed.

It is an object of the invention to provide an information carrier which is capable of containing a larger amount of information than does the known information carrier. For this purpose the information carrier according to the invention is characterized in that the information is recorded in at least two spiral information tracks which may be read independently of one another. The total amount of utilisable information in an information carrier according to the invention is greater than that of the known information by a number of times equal to the number of tracks.

In an information carrier according to the invention the information is preferably stored in two information tracks which are to be read one after the other in opposite directions of the spirals. When reading the information carrier first an information track is read, for example from the edge of the disc to its center, with the information carrier rotating in a given direction, for example, clockwise. Then with the same direction of rotation a second information track is read from the center of the disc to the edge, and so on. Thus after a track has been read the next track may immediately be read without additional displacement of the reading element.

In a first embodiment of an information carrier according to the invention the information tracks are formed in the information carrier at different depths and each track may be read by a beam of radiation which also passes through the other tracks. When the information carrier is being read it may be ensured by optical means that only one information track is in sharp focus. The other information tracks influence only the modulation depth of the signal impressed by the information track being read on the read beam.

The information carrier may be a simple disc provided with information tracks on both major surfaces. Alternatively, the information carrier may comprise a plurality of component discs at least one of which is provided with at least one information track.

According to a second embodiment of an information carrier according to the invention the information tracks are colour-selective, so that a track modulates radiation at a frequency lying in a given range only. The various tracks may be provided in one plane of the information carrier or at different depths in the information carrier.

An apparatus for reading an information carrier according to the invention, which apparatus comprises a source of radiation and a radiation-sensitive detection system and in which in the path of the radiation from the source to the detection system the information carrier may be interposed, is characterized by an optical system capable of influencing the read beam so as to render it suitable for reading one given information track, which optical system may be included in the path of the radiation from the radiation source to the detection system. This optical system may be a plane-parallel plate which changes the image-forming distance of a lens inserted in the path of the radiation from the source to the detection system, a colour filter placed in front of the information carrier or a colour separating element placed behind the information carrier.

Figure 2:
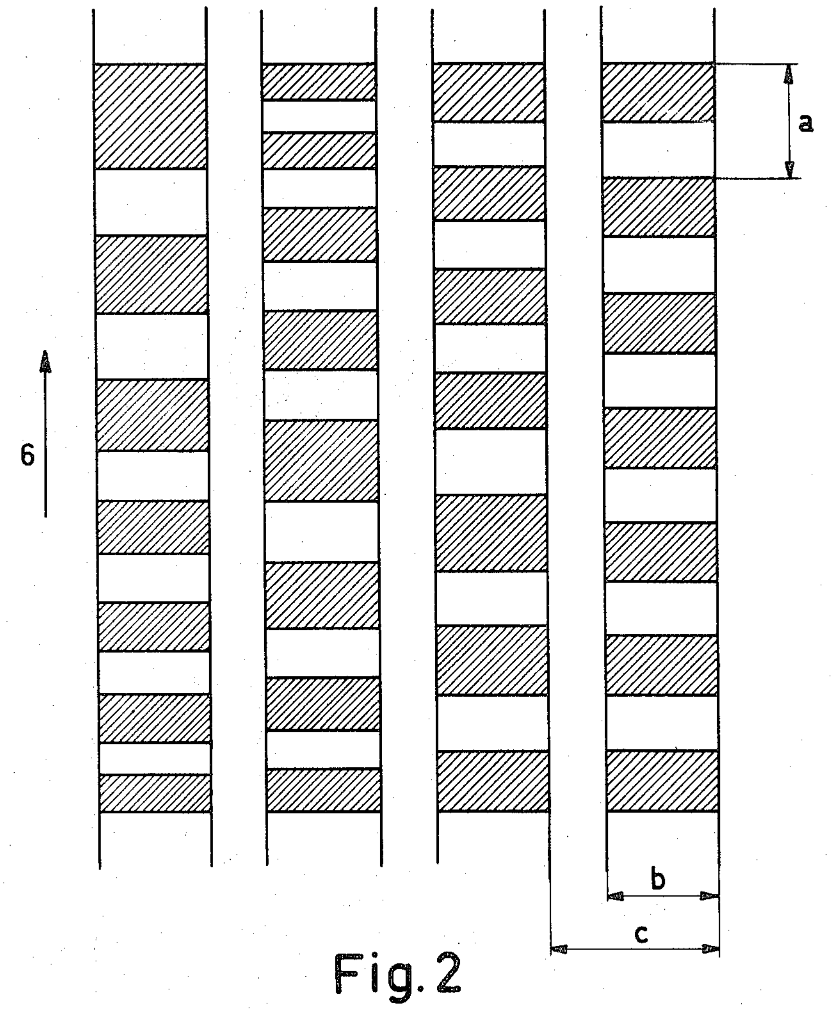
Figure 3A:
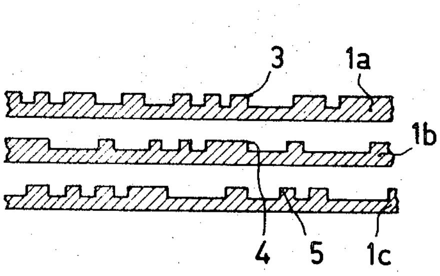
Figure 3B:
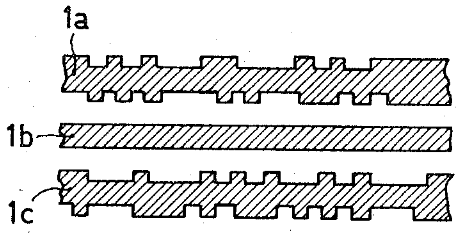
Figure 4:
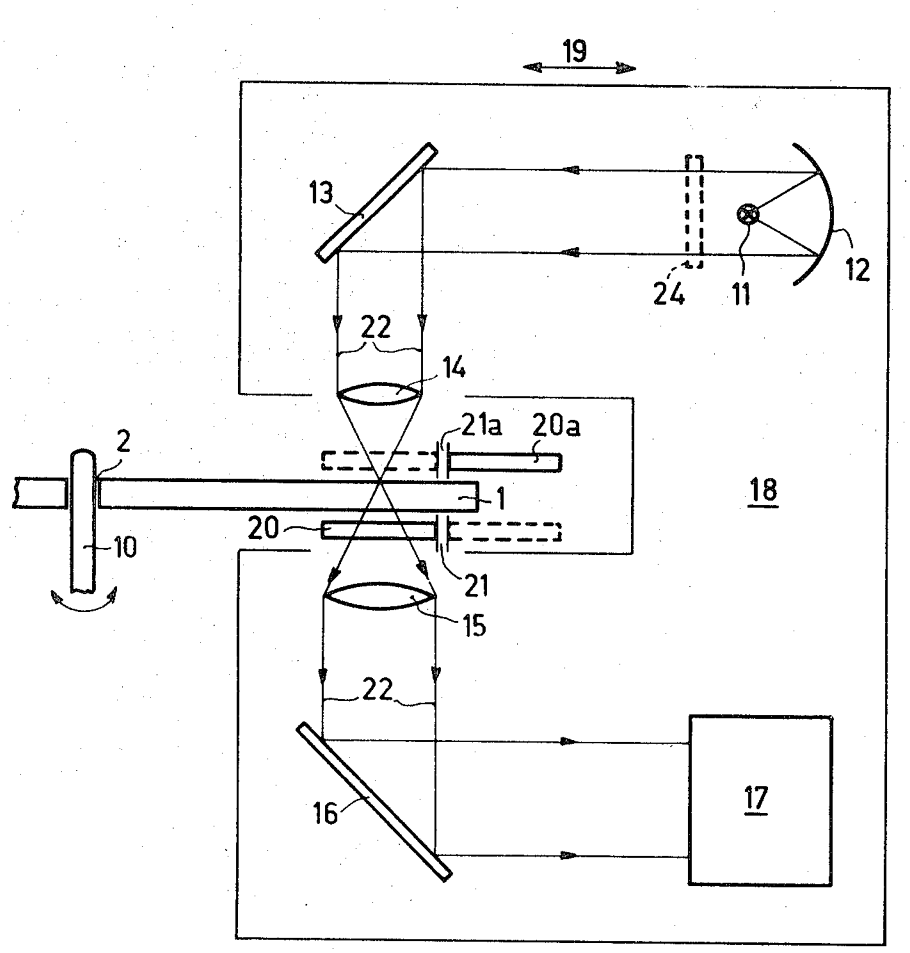
Figure 5A:
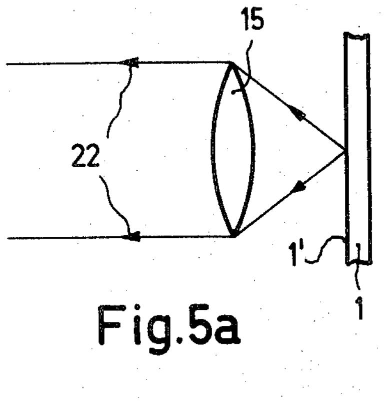
Figure 5B:
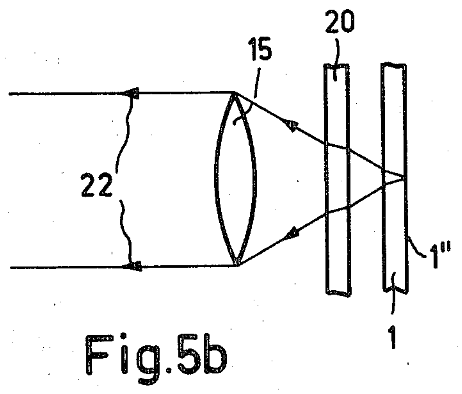
Figure 6:
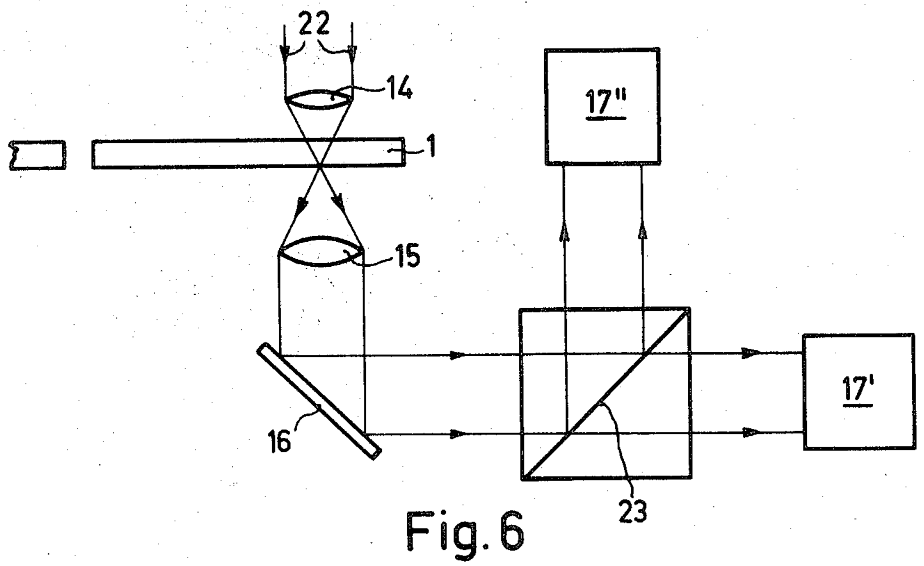

Embodiments of the invention will now be described, by way of example, with reference to the accompanying diagrammatic drawings, in which:

FIGS. 1, 2, 3*a* and 3*b* show embodiments of an information carrier according to the invention, FIG. 4 shows a first embodiment of an apparatus for reading such an information carrier, which apparatus is provided with an optical system according to the invention, FIGS 5*a* and 5*b* illustrate the operation of this optical element, and FIG. 6 shows a second embodiment of a reading apparatus according to the invention.

In the Figures corresponding elements are designated by like reference numerals.

FIG. 1 is a tangential sectional view of part of a disc-shaped information carrier 1. The disc is provided on its upper and lower surfaces with spiral information tracks 3 and 4 respectively in which the information is recorded, for example, in frequency-modulated form.

FIG. 2 is a plan view of a small part of such an information track. An arrow 6 indicates the direction in which the information carrier is moved. The information track comprises a plurality of areas. The mean period *a* in the transversal direction is, say, 4 μm. The width *b* of the areas may also be 4 μm. The period *c* in the radial direction is, say 6 μm. The areas are arranged in concentric or quasi-concentric stripes.

An information track may comprise radiation-transmitting and radiation-absorbing areas or white and black areas, as is shown in FIG. 2. Such a transmission track influences the amplitude of radiation traversing it. However, as has been described in our co-pending application Ser. No. 229,285, filed Feb. 25, 1972, now abandoned, an information track may comprise a plurality of areas lying on two different levels, as is shown in FIG. 1. Such a phase structure influences the phase of the traversing radiation. The great advantage of the relief pattern is that it may be pressed in the disc. Thus a large number of discs may simply be pressed by means of a master.

When reading a disc a read beam is first sharply focussed on, for example, information track 3. After information track 3 has been read, the read beam is focussed on information track 4. The information of the tracks 3 and 4 which is to be successively reproduced may be provided in the form of a clockwise decreasing spiral and in the form of a clockwise increasing spiral, respectively, so that the information track 3 can be read from the edge of the disc to its centre and the information track 4 from the centre of the disc to its edge with the same direction of rotation of the disc.

FIG. 3*a* shows three thin discs which each carry an information track. These three discs may be combined to form a single disc. The information tracks 3, 4 and 5 are provided in corresponding surfaces of the discs, so that in the composite information carrier the tracks are spaced from one another by a distance equal to the thickness of a disc. In this embodiment also both phase structures and transmission structures may be used.

As FIG. 3*b* shows, information tracks may also be provided both in the upper surface and in the lower surface of a component disc. In this case a component disc 1*b* containing no information, which is generally referred to as a spacer disc, is interposed between the information-carrying component discs 1*a* and 1*c*. Such discs containing no information may also be provided as protective discs on both sides of the information carrier.

As remarked hereinbefore, as an alternative, information tracks of different colours, for example red and blue, may be provided in the information carrier. In this embodiment one of the tracks contains red information against a white background. In this connection one should imagine that in FIG. 2 the black areas are replaced by areas which transmit red light and absorb blue light. The white areas in FIG. 2 remain white. In a second, blue track the black areas of FIG. 2 are replaced by areas which transmit blue light and absorb red light. When the information carrier is illuminated with red light the blue track only is operative. On illumination with blue light only the red track is operative. The red and blue information tracks may be provided in different surfaces of the information carrier. As an alternative, however, tracks of different colours may be provided in the same surface of the information carrier. Also, two tracks of different colours may be provided in each of the two major surfaces of the information carrier. Thus, such an information carrier contains four times the information contained in the known information carrier.

An apparatus for reading an information carrier according to the invention is shown schematically in FIG. 4. An information-carrying disc 1 is rotated by means of a spindle 10 which passes through a center hole 2. A beam of radiation 22 emitted by a source of light 11 and reflected by a mirror 12 falls on a plane mirror 13 which reflects it towards the information carrier 1. A lens 14 which focuses the radiation in the plane of the information track to be scanned is interposed between the mirror 13 and the information carrier 1. The radiation beam which emerges from the lens 14 illuminates, for example, a circular area of diameter 300 μm. The beam of radiation 22 which passes through the information carrier 1 is reflected by a plane mirror 16 to a radiation-sensitive detection device 17. An objective lens 15 forms an enlarged image of the area scanned by the beam in the detector plane. The entire optical read system may be accommodated in a casing 18 which is adapted to be moved in the directions indicated by a double-headed arrow 19, enabling the information carrier 1 to be radially scanned. According to the invention the apparatus shown is capable of scanning information tracks both in the upper surface and in the lower surface of the disc. For this purpose the device is provided with a plane-parallel plate 20 made of a radiation-transmitting material, for example glass, and rotatable about a spindle 21 by driving means, not shown. When the plate 20 is inserted in the radiation path of the read beam, as is shown in full lines in FIG. 4, a sharp image of an information track in the upper surface of the information carrier is formed on the detector. If the disc 20 is pivoted out of the path of the read beam, as is shown in broken lines in FIG. 4, a sharp image is formed of an information track in the lower surface of the information carrier. This will be explained with reference to FIG. 5. FIGS. 5*a* and 5*b* shows the situation in which no plane-parallel plate is inserted in the path of the radiation beam 22 and hence the beam is focussed on the surface 1' of the information carrier. In the situation shown in FIg. 5*b* a plane-parallel plate 20 is inserted in the path of the beam 22. The use of a suitable thickness of the plate 20 causes the critical focus of the lens 15 to be changed so that the read beam is focussed on the surface 1'' of the information carrier.

For the same purpose a plane-parallel plate 20*a* may be arranged on the side of the information carrier which faces the lens 14. The plates 20 and 20*a* are moved in phase opposition, i.e., when the plate 20 is inserted in the radiation path the plate 20*a* is outside this path and vice versa. Furthermore an element for correcting optical aberrations introduced by the plane-parallel plate or plates may be included in the path of the read beam.

When an information carrier is to be read, the casing 18 is moved, for example, first from the edge to the centre of the disc while the plane-parallel plate 20 is in the operative position. When the information track in the upper surface has been read, the information track in the lower surface is read without the interposition of the plane-parallel plate, the casing 18 being moved from the center of the disc to the edge. When the information carrier contains more than two information tracks, the alternation of plane-parallel plates and of travelling directions of the casing 18 are accordingly continued.

When the radiation beam is focussed on a given information track it also illuminates a region of an information track situated at another level. This region is so large and contains so many areas *g* (see FIG. 2) that the influence exerted by the individual area *g* on the read beam becomes an average. The average influence will not be more than a reduction of the modulation of the signal produced by interaction of the read beam with the information track to be read. To achieve this effect the vertical spacing between the information tracks must exceed a given value which depends upon the numerical aperture of the lens used. The minimum spacing is of the order of 10 $\mu$m. and does not mean a limitation.

As an alternative, the plane-parallel plate 20 may be inserted in the part of the radiation path beyond the lens 15. In this case, however, the plane-parallel plate must be thicker by a factor equal to the square of the magnifying power of the lens than if the plate were placed before the lens 15.

Instead of a plane-parallel plate the element 20 may also be another optical element, such as a combination of prisms or a lens.

When the information tracks of the information carrier 1 contain colour information a colour filter 24 is inserted in the radiation path preferably between the source 12 and the lens 14, as is shown in broken lines in FIG. 4. When the information carrier carries a red and blue information track this colour filter comprises two parts, one transmitting red light only and the other transmitting blue light only. If the red-transmitting part of the colour filter is inserted in the radiation path, the blue information track will be read. By inserting the blue-transmitting part of the colour filter into the radiation path the red information track may be read.

According to the invention a colour-separating element may alternatively be inserted in the path of the radiation which emerges from the information carrier, as is shown in FIG. 6, which shows part of the apparatus shown entirely in FIG. 4. The information carrier is illuminated with white light. The red and blue components of this light are modulated in accordance with the information present in the blue and red information tracks respectively. The modulated components are separated by a colour-separating element, for example a colour-selective mirror 23, and applied to two radiation-sensitive detector cells 17' and 17'' respectively. The advantage of this arrangement is that it is not necessary to insert or remove a filter when two information tracks are to be successively read. When a colour-separating element is used it is also possible to simultaneously read two different colour tracks, for example a track containing image information and a track containing sound information.

What is claimed is:

1. An information carrier comprising a transparent disc-shaped carrier, a first planar spiral shaped information track in said carrier, a second planar spiral shaped information track in said carrier parallel to said first track, said first spiral track decreasing in distance from the center of the carrier in one rotational direction viewed from one side of said carrier, said second spiral track increasing in distance from the center of the carrier in said one rotational direction viewed from one side of said carrier, information signal successively recorded along said first information track from the outer portion of said first information track to the inner portion thereof, information signals successively recorded along said second information track from the inner portion of said second information track toward the outer portion thereof, said information being recorded in each track in the form of a plurality of spaced areas of optically transparent material, all of the areas of each track having a coplanar surface, the coplanar surface of said first track being spaced from the coplanar areas of said second track and parallel thereto, all the material in the disc between the coplanar surface of each area in each information track and the next following information track in the disc being optically transparent, whereby a converging beam of radiation from one side of the disc passes through the coplanar surfaces of the information tracks and may be focussed on said first track until all the information recorded thereon is scanned, and then immediately refocussed through said first track, scanning the information of said second track maintaining the rotational direction of said carrier without the necessity of turning said carrier over or displacing said beam rapidly to the outer portion of said second track.

2. An information carrier as claimed in claim 1, wherein said carrier further comprises a third optically encoded information track parallel to said first and second information tracks and spaced therefrom.

3. An information carrier as claimed in claim 1, wherein the tracks are arranged on two opposed major surfaces of the disc.

4. Information carrier as claimed in claim 1, wherein the information carrier comprises a number of component discs at least two of which are provided with at least one information track, and a spacer disc intermediate the component discs.

* * * * *

PO-1050
(5/69)

UNITED STATES PATENT OFFICE
CERTIFICATE OF CORRECTION

Patent No. 3,855,426 Dated December 17, 1974

Inventor(s) GIJSBERTUS BOUWHUIS

It is certified that error appears in the above-identified patent and that said Letters Patent are hereby corrected as shown below:

IN THE SPECIFICATION

Col. 4, line 27, "Fig. 5. Figs 5a and 5b" should read

--Figs. 5a and 5b. Fig. 5a--;

line 31, "FIg. 5b" should be --Fig. 5b--;

IN THE CLAIMS

Claim 1, line 10, "signal" should be --signals--;

Signed and sealed this 18th day of February 1975.

(SEAL)
Attest:

RUTH C. MASON
Attesting Officer

C. MARSHALL DANN
Commissioner of Patents
and Trademarks